US005479588A

United States Patent [19]
Sawada et al.

[11] Patent Number: 5,479,588
[45] Date of Patent: Dec. 26, 1995

[54] BAR CODE PRINTING APPARATUS

[75] Inventors: Akihiro Sawada; Akihiko Niwa; Hideo Ueno, all of Nagoya, Japan

[73] Assignee: Brother Kogyo Kabushiki Kaisha, Nagoya, Japan

[21] Appl. No.: 28,119

[22] Filed: Mar. 9, 1993

[30] Foreign Application Priority Data

Jun. 8, 1992 [JP] Japan ................... 4-174780

[51] Int. Cl.⁶ ................................. G06K 1/12
[52] U.S. Cl. ........................... 395/117; 395/113
[58] Field of Search ................. 380/23, 3, 51; 364/519; 382/1; 395/117; 235/463; 400/103

[56] References Cited

U.S. PATENT DOCUMENTS

| | | | |
|---|---|---|---|
| 4,641,347 | 2/1987 | Clark et al. | 380/3 |
| 4,660,221 | 4/1987 | Dlugos | 380/23 |
| 4,829,568 | 5/1989 | Clark et al. | 380/23 |
| 5,083,816 | 1/1992 | Folga et al. | |
| 5,239,622 | 8/1993 | Best et al. | 395/117 |
| 5,290,110 | 3/1994 | Takahashi | 395/108 |
| 5,307,501 | 4/1994 | Yuge | 395/113 |

FOREIGN PATENT DOCUMENTS

| | | | |
|---|---|---|---|
| 0352091 | 1/1990 | European Pat. Off. | G06K 1/12 |
| 0422648 | 4/1991 | European Pat. Off. | |
| 2-106555 | 4/1990 | Japan . | |
| 4031068 | 3/1992 | Japan . | |

*Primary Examiner*—Mark R. Powell
*Assistant Examiner*—Steven P. Sax
*Attorney, Agent, or Firm*—Oliff & Berridge

[57] ABSTRACT

A character string and data characters for printing a bar code are first input, and a print key is operated. When the data read from a text memory of the apparatus are character data, the apparatus creates dot pattern data for printing the character string as per the character size selected. When bar code starting data are read, the data following the characters are read out and converted into bar code data. After the data representing a left-hand side margin of the bar code are generated, dot pattern data constituting the bar code are created in accordance with the height of the character size selected. Then, a right-hand side margin of the bar code is generated.

20 Claims, 12 Drawing Sheets

BAR CODE PRINTING APPARATUS

BACKGROUND OF THE INVENTION

1. Field of the Invention

The present invention relates to a bar code printing apparatus and, more particularly, to a bar code printing apparatus capable of leaving predetermined blanks on the right-hand and left-hand sides of each bar code when it is printed.

2. Description of the Related Art

Today, bar codes are utilized extensively as identification codes of diverse goods and articles in accordance with various bar code standards such as JAN (Japan Article Number), EAN (European Article Number) and the Code 39. Bar codes are printed on the packages and labels of various goods and articles. There is one requirement for these bar codes to be read accurately by bar code reader: that each bar code must be flanked on its right-hand and left-hand sides by sufficient blanks (called margins or quiet zones). The absence of the margins often makes it impossible for the bar code reader subsequently to read the bar code. Where a character string is modified in a specific manner (e.g., expanded in width as in italics), the rightmost end of the character string can overlap with the leftmost end of the bar code.

Tape printing devices capable of printing characters and symbols on tapes used as the printing medium are known (tapes typically measure about 10 mm and about 24 mm in width). However, in the past, tape printing devices have not been capable of printing bar codes on the tape printing medium with sufficient margins to ensure accurate reading of the printed bar codes by a bar code reader.

SUMMARY OF THE INVENTION

It is therefore an object of the present invention to provide a bar code printing apparatus capable of creating dot pattern data in such a manner as to leave predetermined blanks on the right-hand and left-hand sides of a bar code when characters, symbols and the bar code are printed consecutively.

In carrying out the invention and according to one aspect thereof, there is provided a bar code printing apparatus for printing characters, symbols and bar codes on a printing medium, comprising, input means for inputting characters, symbols and various commands; input data storage means for storing the data about the characters and symbols input through the input means as well as bar code data; print means having a print head comprising a plurality of dot type printing elements; and pattern data creating means for creating dot pattern data in such a manner as to leave predetermined blanks on the right-hand and left-hand sides of each bar code printed upon receipt of character data, symbol data and bar code data from the input data storage means.

With the invented bar code printing apparatus, the character and symbol data input through the input means as well as bar code data are first stored in the input data storage means. The pattern data creating means receives character data, symbol data and bar code data from the input data storage means, and creates dot pattern data in such a manner as to leave predetermined blanks on the right-hand and left-hand sides of the bar code to be printed. In accordance with the dot pattern data thus created, the print means prints the characters, symbols and bar code on the printing medium.

What is noteworthy of the invention is that two kinds of dot pattern data are created. On the one hand, the dot pattern data about the characters and symbols to be printed are created; on the other hand, the bar code dot pattern data are created so as to leave predetermined blanks on both sides of the printed bar code. When characters, symbols and a bar code are printed on the same line, the bar code is separated distinctly from these characters or symbols by use of the predetermined blanks that flank the code on both sides. In this manner, the bar code reader can subsequently read the printed bar code unfailingly.

As described, the bar code printing apparatus according to the invention has its pattern data creating means create dot pattern data representing characters and symbols as well as dot pattern data constituting a bar code flanked on both sides by appropriate margins. Thus when the bar code is printed along with characters and symbols on the same line, the margins keep the bar code distinct from the adjacent characters and symbols. This makes it possible for bar code readers subsequently to read the printed bar code unfailingly. Even if the character string is modified to be widened, as in italics, the margin keeps the nearest character from overlapping with any portion of the bar code.

DETAILED DESCRIPTION OF PREFERRED EMBODIMENTS

A preferred embodiment according to the invention will now be described with reference to the accompanying drawings. This embodiment is implemented by applying the invention to a tape printing apparatus dedicated to English language printing and capable of printing alphabetic and symbolic characters onto printing tapes.

Figure 1:
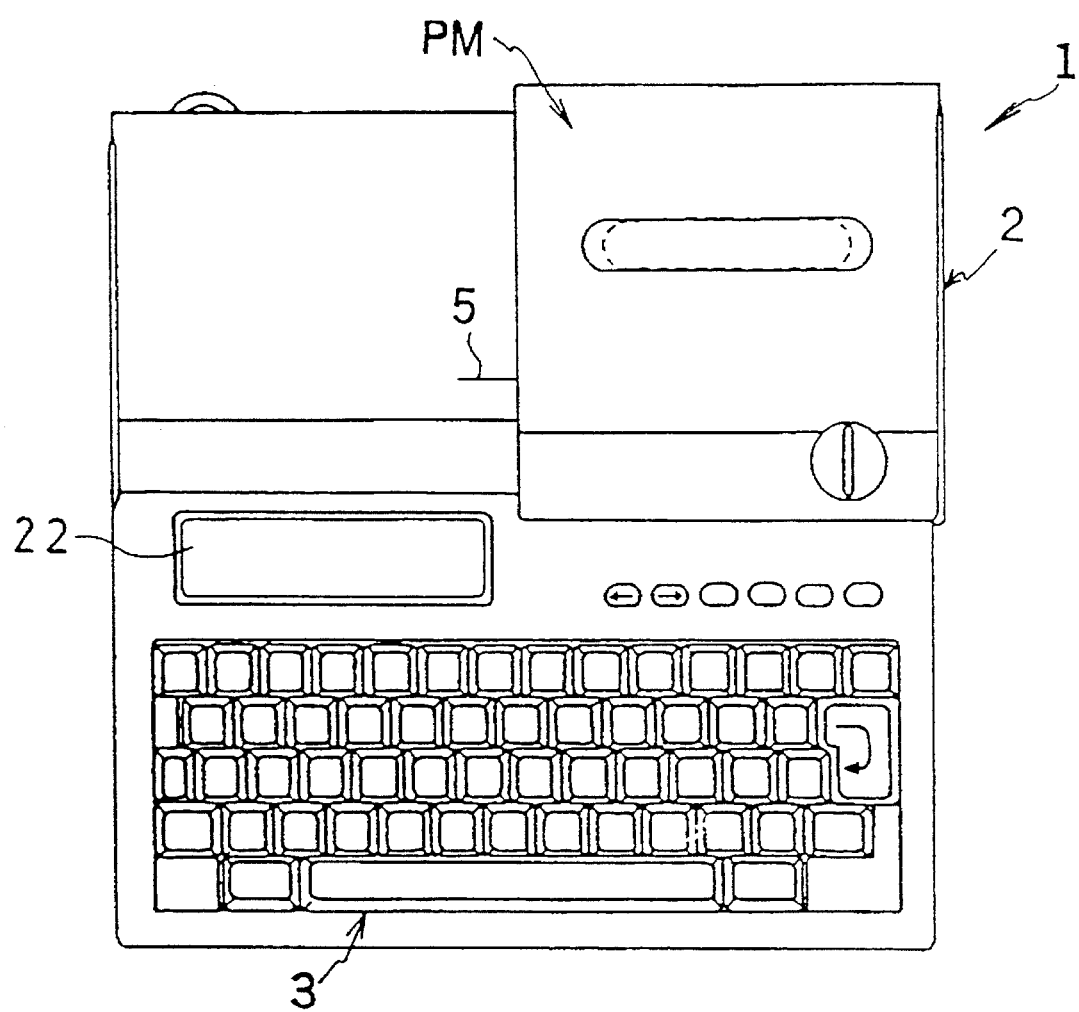
FIG. 1 is a plan view of a tape printing apparatus according to the present invention.

As shown in FIG. 1, the embodiment is constituted of a tape printing apparatus 1 with its frame 2 having a keyboard 3 attached in front. Behind the keyboard 3 and inside the frame 2 is disposed a printing mechanism PM. Also, in the back of the keyboard 3 is a liquid crystal display 22 capable of displaying characters and symbols.

The keyboard 3 contains various keys: character keys for inputting alphanumeric and symbolic characters; a space key; a return key; cursor moving keys for moving the cursor right and left; a text creating key for creating text data; a bar code key for inputting bar code data; a format setting key for setting a print format; a size setting key for setting a desired print character size; a font setting key for setting a desired print character font; a stop key for terminating various input and editing processes; a cancel key for canceling various editing processes; a print key for designating printing; and a power key for turning on and off power to the apparatus.

Figure 2:
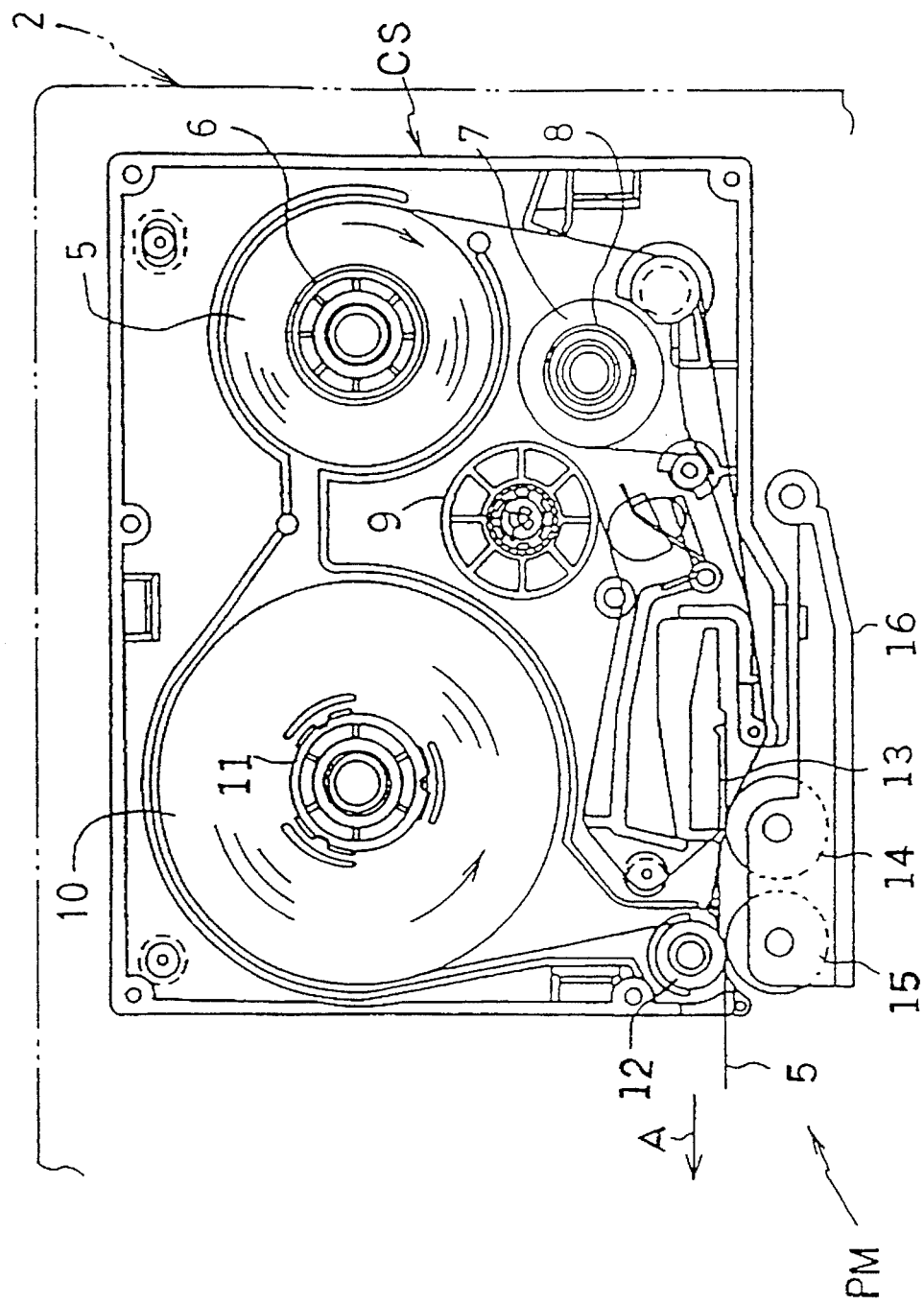
FIG. 2 is a schematic plan view of the printing mechanism.

The construction of the printing mechanism PM is outlined below with reference to FIG. 2. A rectangular tape accommodating cassette CS is attached removably to the printing mechanism PM. The tape accommodating cassette CS has a tape spool 6, a ribbon feed spool 8, a take-up spool 9, a feed spool 11 and a contact roller 12 rotatably installed inside. The tape spool 6 has a print tape 5 wound around it. The print tape 5 is preferably made of a transparent film and is about 24 mm in width. The ribbon feed spool 8 has an ink ribbon 7 wound around it. The take-up spool 9 takes up the ink ribbon 7 fed from the ribbon feed spool 8. The feed spool 11 has an adhesive double-coated tape 10 wound around it. The tape 10 is approximately the same in width as the print tape 5 and is wound around the feed spool 11 with a strip paper side facing outward. The contact roller 12 brings the print tape 5 into contact with the adhesive double-coated tape 10.

A thermal head 13 is erected in the position where the print tape 5 and ink ribbon 7 overlap with each other. A platen roller 14 pushes the print tape 5 and ink ribbon 7 against the thermal head 13. A feed roller 15 is provided to press the print tape 5 and adhesive double-coated tape 10 against the contact roller 12. The platen roller 14 and contact roller 12 are both supported rotatably by a support member 16. The thermal head 13 has a heating element group preferably comprising 128 heating elements arranged vertically.

In operation, a tape feed motor 24 (see FIG. 3) is driven to rotate the contact roller 12 and take-up spool 9 synchronously in their respective rotating directions, and the heating element group is energized. This causes a plurality of dot columns to form printed characters on the print tape 5 while the tape 5 is being fed in a direction A (FIG. 2) with the adhesive double-coated tape 10 stuck thereon. A more detailed description of the printing mechanism PM is contained in Japanese Patent Laid-Open No. Hei/2-106555.

Figure 3:
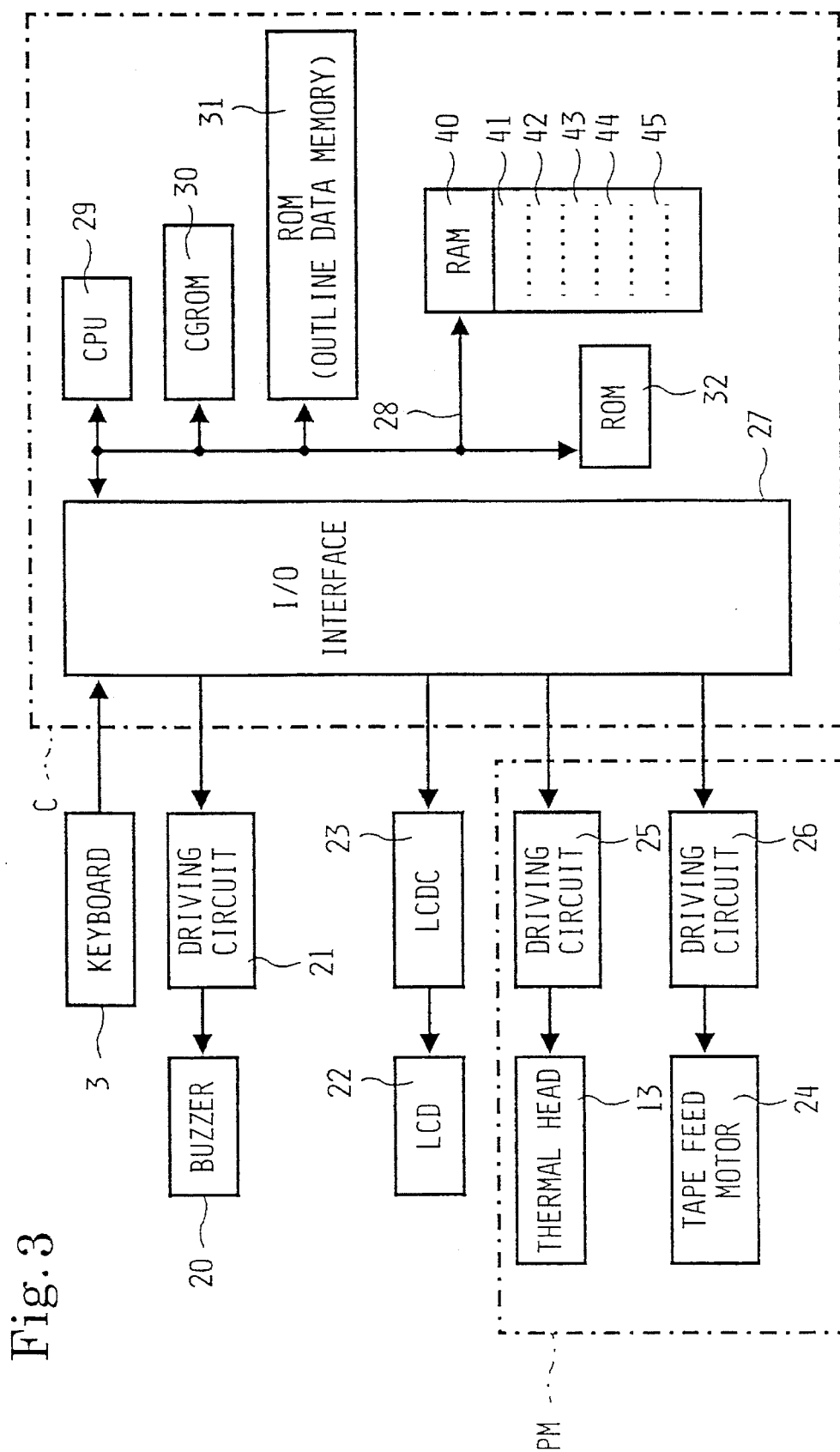
FIG. 3 is a block diagram of the control system of the tape printing apparatus.

The control system of the tape printing apparatus 1 is structured as shown in the block diagram of FIG. 3. Referring to FIG. 3, an input/output interface 27 of a controller C is connected with a keyboard 3, a display controller (LCDC) 23 and driving circuits 25, 26 and 21. The display controller 23 has a display RAM for outputting display data to a liquid crystal display (LCD) 22. The driving circuit 25 drives the thermal head 13; the driving circuit 26 drives the tape feed motor 24; and the driving circuit 21 activates an alarm buzzer 20. The controller C comprises a CPU 29, the I/O interface 27 connected to the CPU 29 via a bus arrangement 28 containing a data bus, a CGROM 30, ROM's 31 and 32, and a RAM 40.

The CGROM 30 is a pattern data memory in which dot pattern data about numerous characters for display are stored in correspondence with code data. The ROM 31 is an outline data memory that contains outline data for designating the outlines of many characters, the data being classified by font (Gothic, Mincho typeface, etc.) and in correspondence with code data.

The ROM 32 accommodates a number of programs: a display drive control program for controlling the display controller 23 in keeping with the code data about the characters, numerals and symbols input through the keyboard 3; an image development control program for converting the outline data corresponding to the code data in a text memory 41 into dot pattern data for development in a print buffer 44; a printing drive control program for consecutively reading data from the print buffer 44 in order to drive the thermal head 13 and tape feed motor 24; and a tape printing control program unique to this invention for tape printing control, to be described later. The tape printing control program includes subroutines for bar code data conversion control aimed at the conversion of the character data made of a plurality of characters or numerals in the text memory 41 into bar code data in accordance with one of such diverse bar code standards as JAN (Japan Article Number), EAN (European Article Number) and the Code 39.

The text memory 41 in the RAM 40 stores text data input from the keyboard 3 as well as bar code data characters. A print format memory 42 accommodates data about a plurality of print formats including the selected character size and font. A bar code buffer 43 contains the character data made of a plurality of characters and numerals needed to print a bar code. The print buffer 44 stores the dot pattern data about characters and symbols developed as images as well as bar code pattern data. To execute its function, the print buffer 44 has a capacity large enough to accommodate 128 bits (16 bytes) corresponding to 128 dots in the vertical direction (in the dot column direction) and a predetermined number of bits corresponding to a plurality of characters in the horizontal direction. A print pointer 45 (with pointer value PP) contains that single address in the text memory 41 from which to read the code data for printing.

Figure 4:
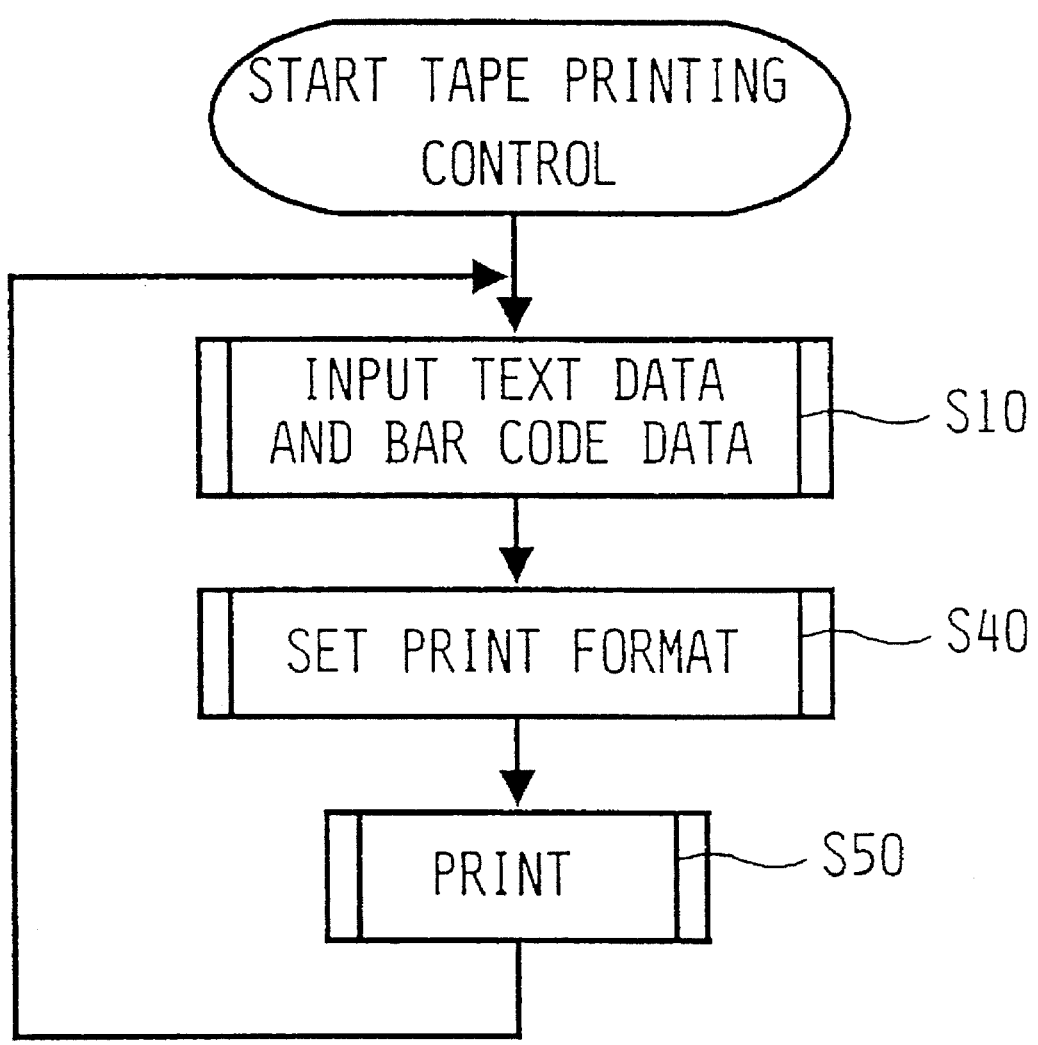
FIG. 4 is a flowchart outlining how the tape printing control routine is executed.

Described below with reference to the flowchart of FIG. 4 is how a tape printing control routine is executed by the controller C of the tape printing apparatus 1. Operating the power key applies power and initiates control of the tape printing control routine. In step S10, operating the text creating key executes text data input processing whereby the text data made of the code data about the input characters and symbols are stored into the text memory 41. When the bar code key is operated in step S10, bar code data input processing is carried out, as will be described later.

In step S40, operating the print format key enables various print formats to be established. Thus, when the size setting key is operated, a desired character size may be set; and when the font setting key is operated, a desired typeface may be set.

In step S50, the print key is operated to execute print processing. Operating the key creates the dot pattern data for printing text data as well as for printing a bar code, the data being developed in the print buffer 44. The dot pattern data are then output to the printing mechanism PM for printing. At the end of the print processing, step S10 is reached again.

Figure 5:
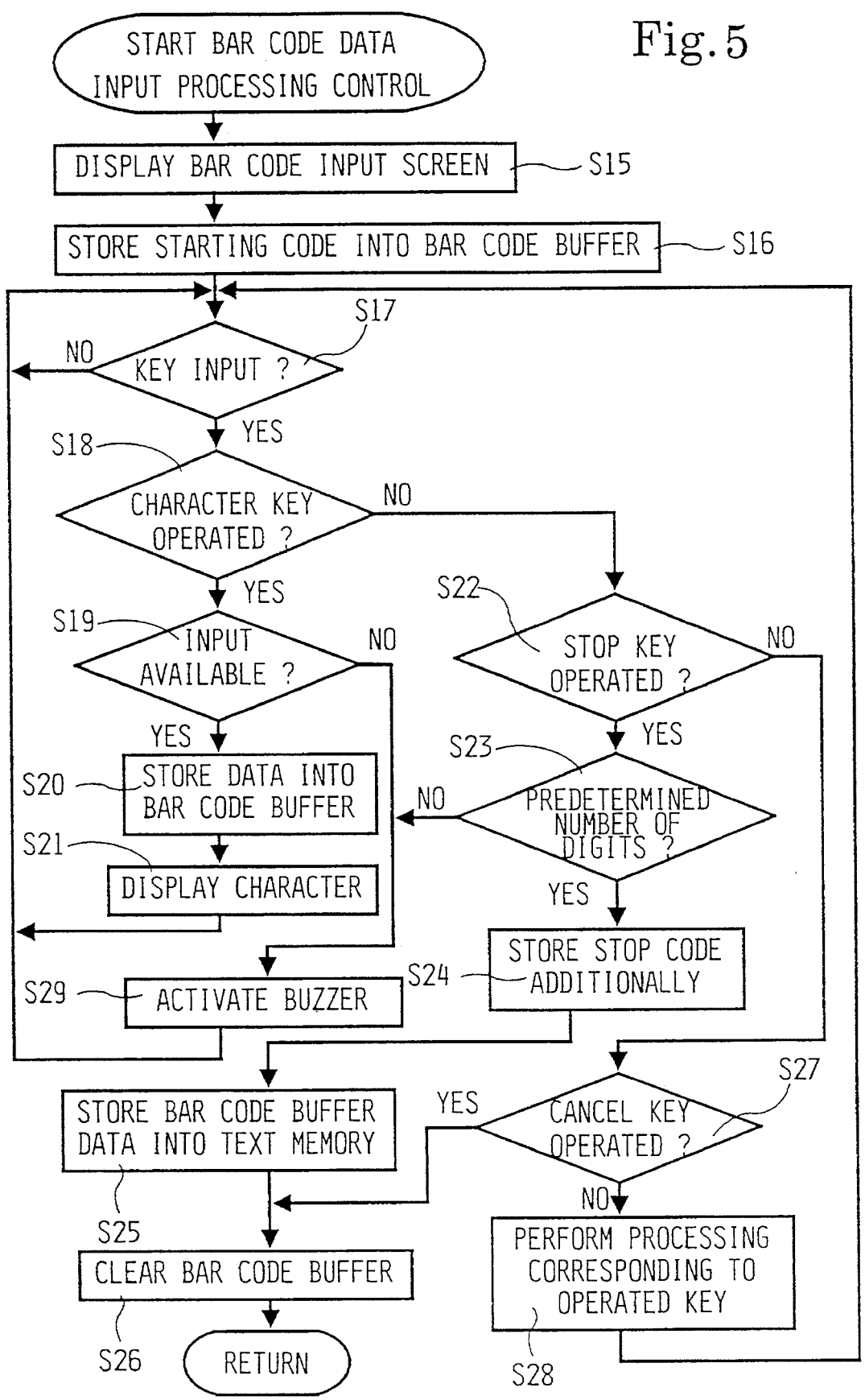
FIG. 5 is a flowchart outlining how the bar code data input processing control routine is executed.
Figure 8:
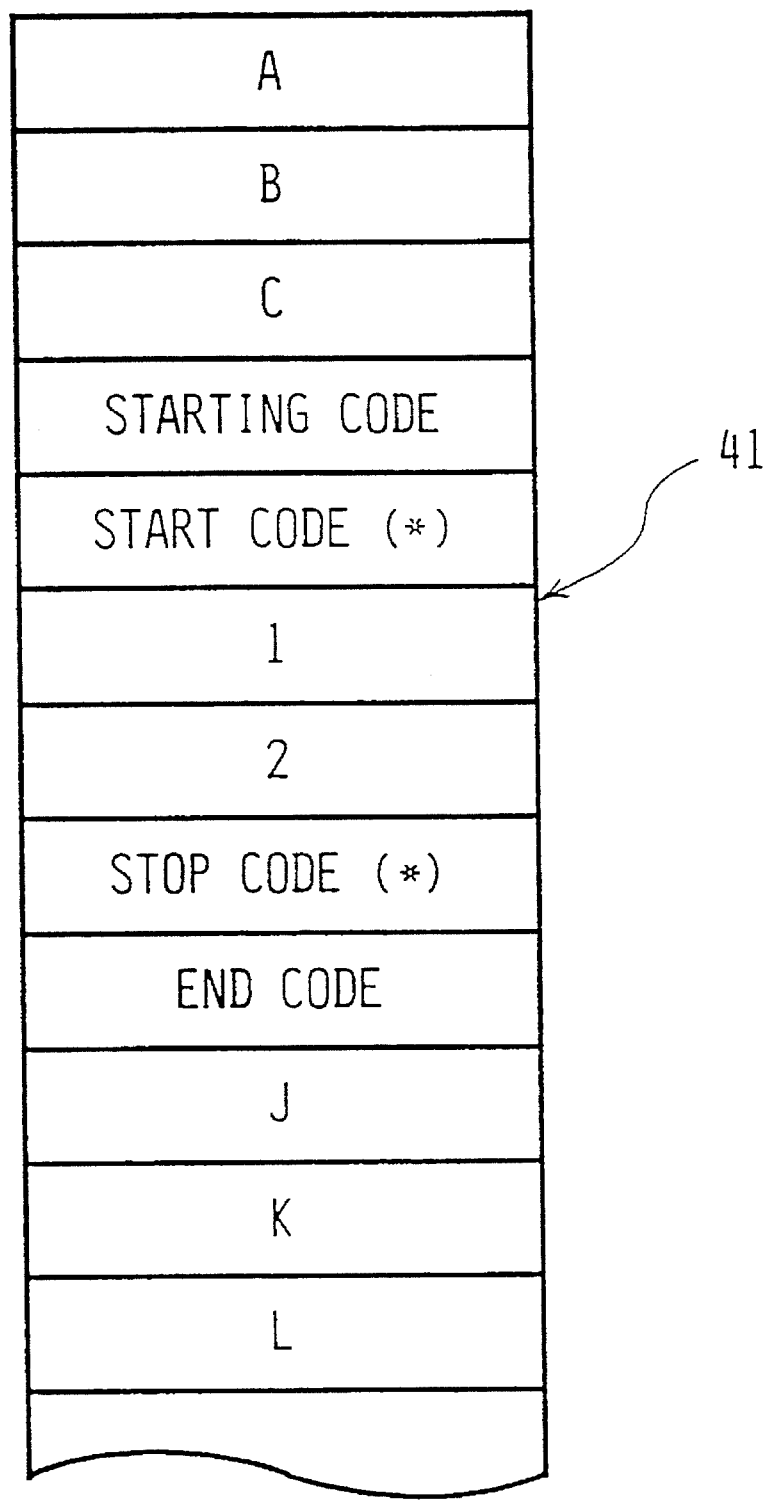
FIG. 8 is a view of a typical data structure in the text memory.

The execution of a bar code data input processing control routine by operation of the bar code key will now be described with reference to the flowchart of FIG. 5. It is assumed that before this control routine is started, the text memory 41 contains characters "ABC" as shown in FIG. 8.

Figure 9:
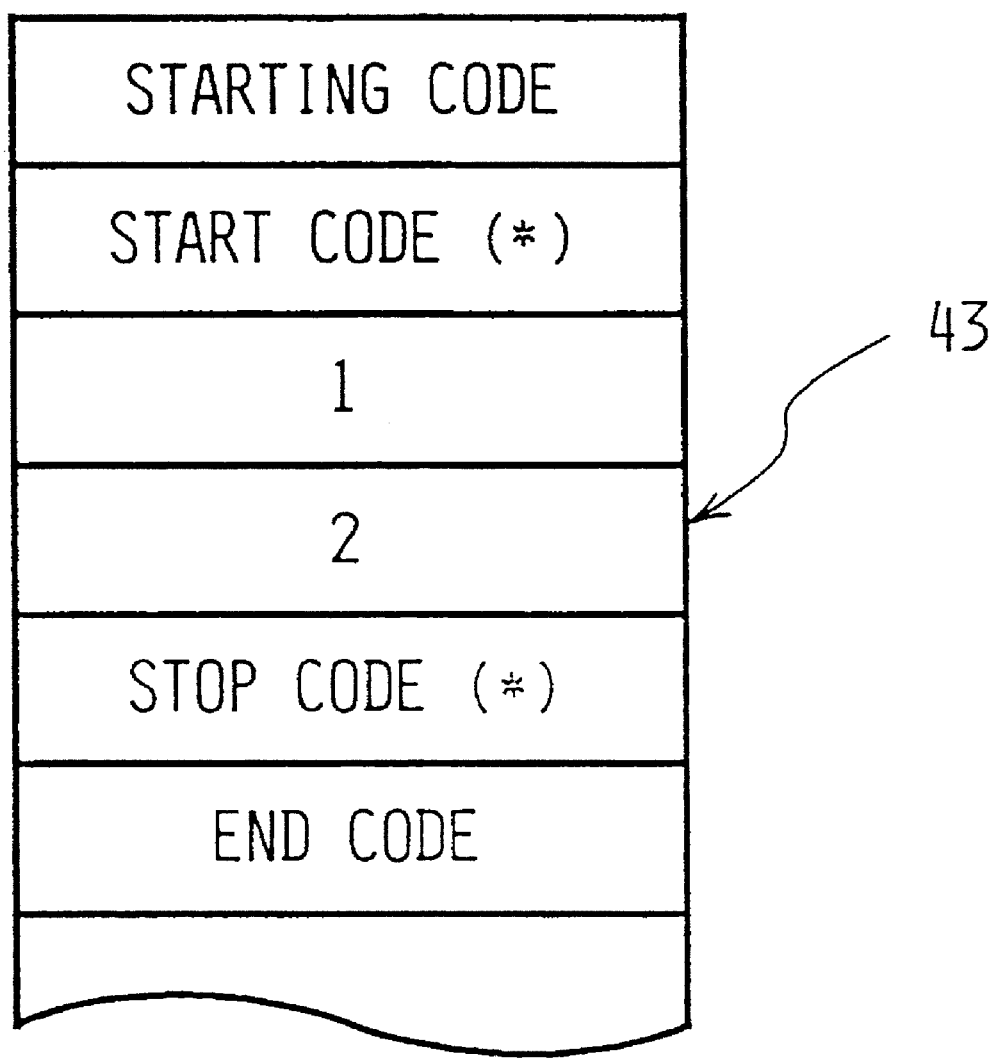
FIG. 9 is a view of a typical data structure in the bar code buffer.
Figure 10:
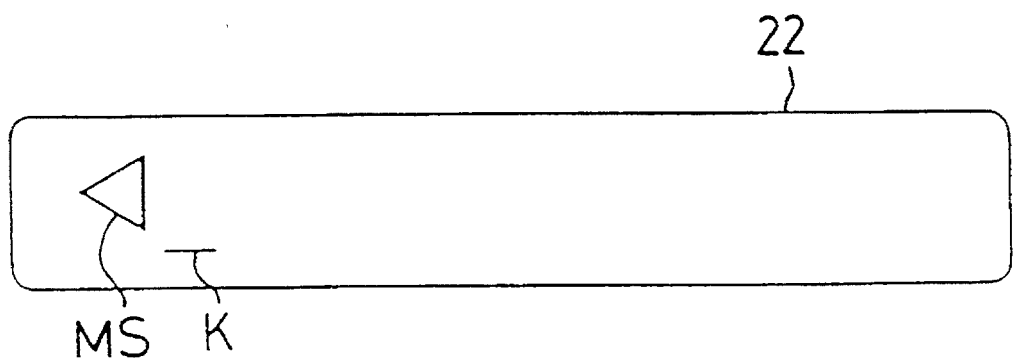
FIG. 10 is a view of a typical bar code data input display.
Figure 11:
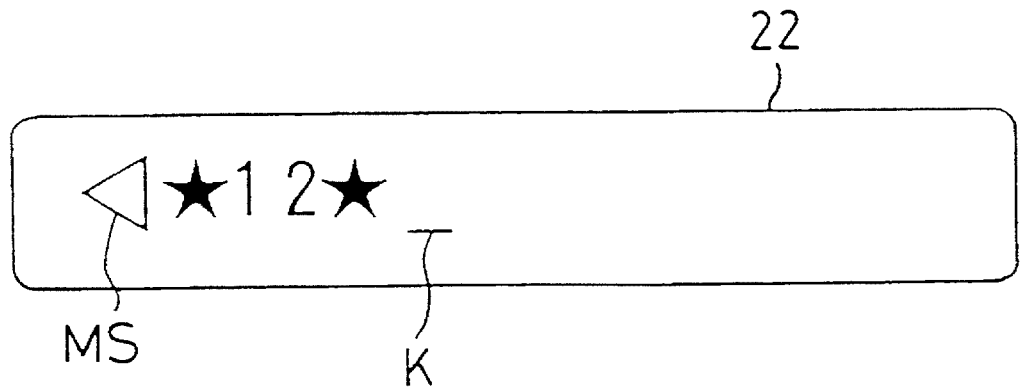
FIG. 11 is a view of a typical display in which numerals corresponding to data characters are input.

Starting the bar code data input processing control routine establishes a bar code input mode. In step S15, a bar code input screen is displayed. In step S16, a bar code starting code is placed into the bar code buffer 43. If Code 39 is selected as the bar code standard, a start code "*" is additionally stored into the bar code buffer 43 in step S16. For example, as depicted in FIG. 10, a leftward-pointed triangular starting mark MS appears in the starting position on the display 22 that has been cleared. When Code 39 is selected, the first address of the bar code buffer 43 accommodates the bar code starting code as well as the start code "*", as shown in FIG. 9. The symbol "K" in FIGS. 10 and 11 represents the cursor.

Step S17 checks to see if any key input has been made. If key input is recognized (YES decision in step S17), step S18 is reached in which a check is made to see if any character key (including numeric key) is operated. If any character key (including numeric key) is found to be operated (YES in step S18), step S19 checks to see if it is possible to enter the character, illustratively because the number of numeric digits in the bar code buffer 43 is smaller than a predetermined number of digits under the JAN bar code standard selected. If the bar code buffer 43 is found to have a capacity to spare, the character code representing the character is placed into the bar code buffer 43 in step S20. In step S21, the character corresponding to the character code is displayed on the display 22. Step S21 is followed by step S17. Illustratively, where the Code 39 bar code standard is in effect, characters "12" input in the above manner are displayed on the display 22 as shown in FIG. 11.

If the stop key is operated to terminate data character input (YES in step S17; NO in step S18; YES in step S22), a check is made in step S23 to see if numeric codes of a predetermined number of digits are stored in the bar code buffer 43, as under the JAN bar code standard. If such numeric codes are found to be stored in the bar code buffer 43 (YES in step S23), step S24 is reached in which a bar code termination code is additionally placed into the bar code buffer 43. In step S25, the entire code sequence in the bar code buffer 43 is stored into the text memory 41. In step S26, the bar code buffer 43 is cleared. The bar code data input processing is then terminated, and control is returned to the tape printing control routine. Where the Code 39 is selected as the bar code standard, a stop code "*" is additionally stored in step S24. For example, the entire code sequence in the bar code buffer 43 (see FIG. 9), including those data characters for the bar code which were input according to the Code 39, is stored additionally into the text memory 41 as illustrated in FIG. 8.

If the cancel key is found to be operated (YES in step S17; NO in steps S18 and S22; YES in step S27), the bar code buffer 43 is cleared in step S26. The processing is then terminated, and control is returned to the tape printing control routine. The buzzer 20 is activated for warning in step S29 and step S17 is reached in two cases: if a character key is found to be operated when the bar code buffer 43 contains the predetermined number of digits (YES in steps S17 and S18; NO in step S19), or if the bar code buffer 43 does not contain a numeric code representing the predetermined number of digits when the stop key is operated (NO in step S23).

If any key other than the character keys, the stop key or the cancel key is operated (YES in step S17; NO in steps S18, S22 and S27), step S28 is reached. In step S28, the processing corresponding to the operated key is executed. Then step S17 is reached again.

Figure 6:
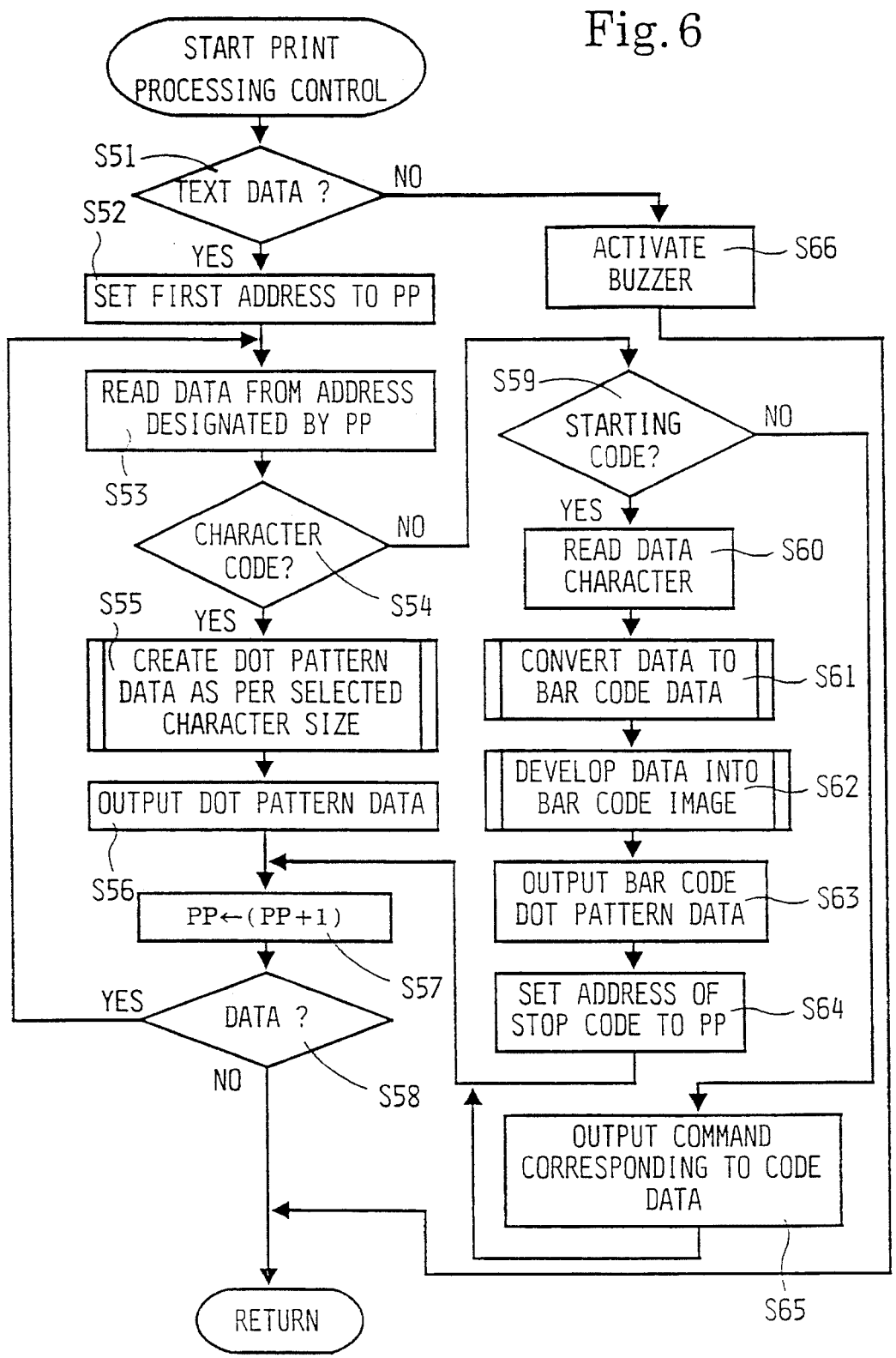
FIG. 6 is a flowchart outlining how the print processing control routine is executed.

How a print processing control routine is executed by operation of the print key will now be described with reference to the flowchart of FIG. 6. After the print processing control routine is started, a check is made in step S51 to see if any text data exist in the text memory 41. If text data exist in the text memory 41 (YES in step S51), the first address of the text memory 41 is set to the print pointer value PP in step S52. If the code data pointed to by the print pointer value PP represent a character code (YES in steps S53 and S54), step S55 is reached. In step S55, a scale factor is obtained based on the size data established. The scale factor is used to enlarge or contract the outline data. From the outline data, dot pattern data for printing are created and are stored into the print buffer 44. In step S56, the dot pattern data are read from the print buffer 44 and output to the printing mechanism PM for printing.

In step S57, the print pointer value PP is incremented by 1. In step S58, a check is made to see if the text memory 41 contains any code data. If code data exist in the text memory 41 (YES in step S58), step S31 and the subsequent steps are repeated. If the code data that were read in step S53 turn out to be a bar code starting code (NO in step S54; YES in step S59), the data characters of the bar code stored between the next address and the end code are read in step S60. The data constituting these data characters are converted into bar code data in step S61 by the bar code data conversion processing control routine in accordance with the bar code standard selected. In step S62, the bar code data are developed into an image (see FIG. 7).

Figure 7:
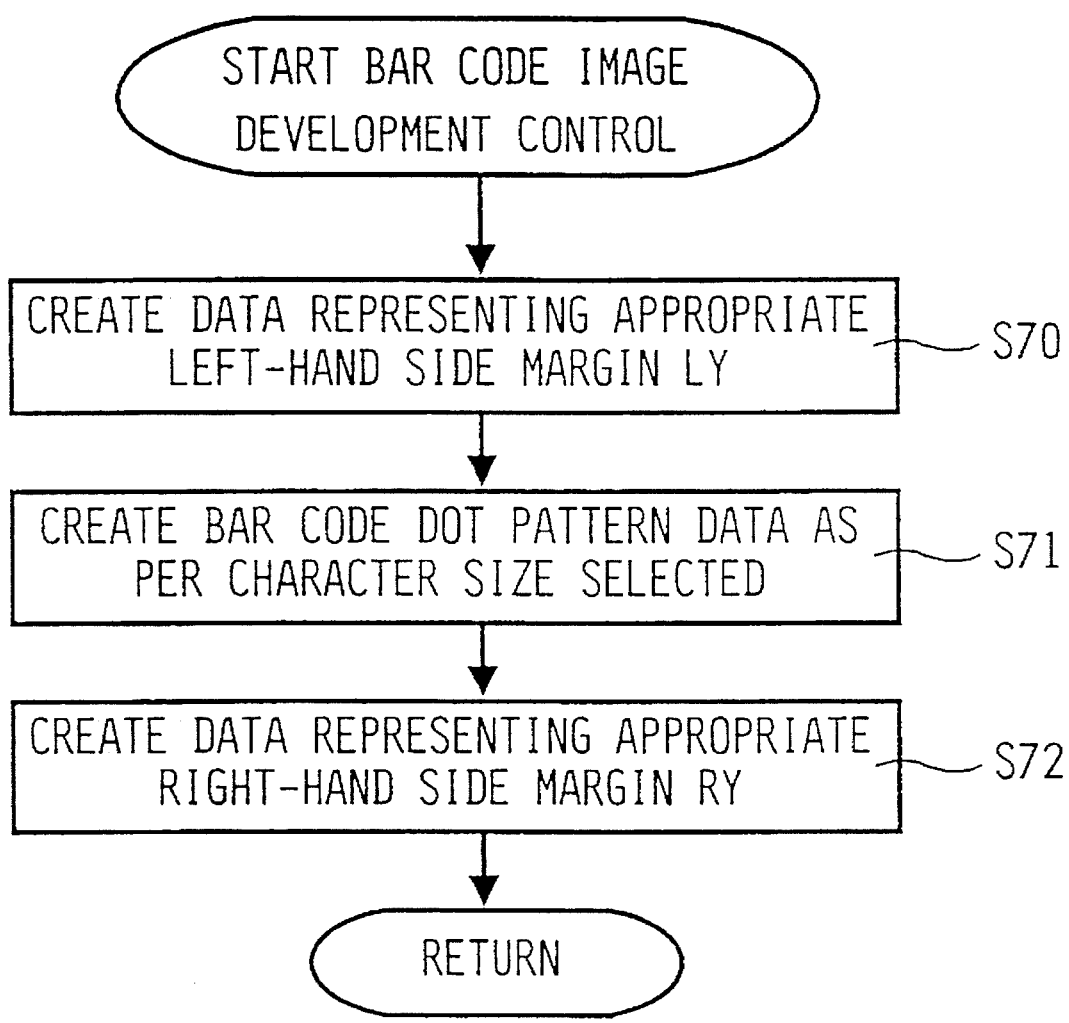
FIG. 7 is a flowchart outlining how the bar code image development control routine is executed.
Figure 12:
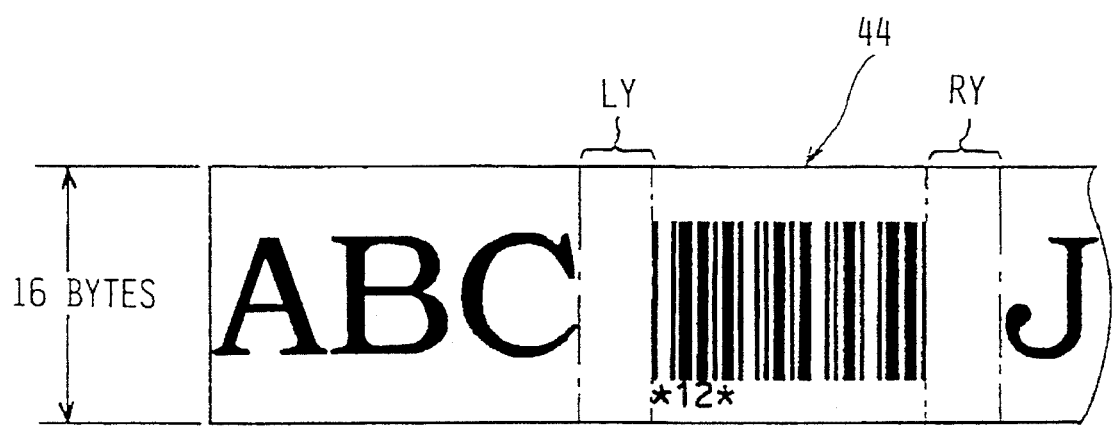
FIG. 12 is a view of a typical data structure in the print buffer.

When image development control is started as shown in FIG. 7, step S70 is entered first. Step S70 creates the margin data in the print buffer 44 representing a left-hand side margin LY of a predetermined width on the left-hand side of the bar code. For example, as shown in FIG. 12, the dot pattern data representing an image-developed character string "ABC" are immediately followed by a left-hand side margin LY of about 45 dot columns (about 6.3 mm) created in the print buffer 44. In step S71, the dot pattern data for use as the bar code are created to be the same height as the character size in accordance with the size data and a plurality of data characters. The created dot pattern data are placed in the print buffer 44. In step S72, the margin data are created in the print buffer 44 representing a right-hand side margin RY of a predetermined width on the right-hand side of the bar code. Illustratively, as shown in FIG. 12, the bar code data are followed immediately by the right-hand side margin RY of 45 dot columns. With the bar code image development terminated, step S72 is followed by step S63 (FIG. 6) of the print processing control routine.

In step S63, the bar code dot pattern data in the print buffer 44 are output to the printing mechanism PM for printing. Step S64 sets an end code address to the print pointer value PP, followed by step S57 and the subsequent steps.

If the code data that were read represent neither a character code nor a starting code (e.g., space code; NO in steps S54 and S59), step S65 is reached. Step S65 outputs a command corresponding to the code data to the printing mechanism PM, followed by step S57.

When all data in the text memory 41 are found to have been printed in step S58, the print processing is terminated and control is returned to the tape printing control routine of FIG. 4. If no text data are found to exist in the text memory 41 in step S51, step S66 is reached in which the buzzer 20 is activated. In that case, control is also returned to the tape printing control routine of FIG. 4.

Figure 13:
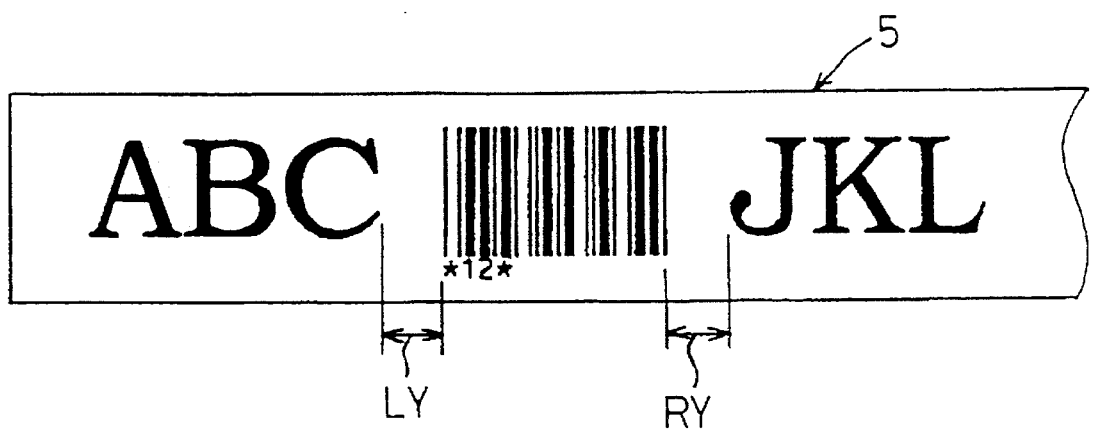
FIG. 13 is an illustrative view of characters and a bar code as they are printed.

As a result, the character string and bar code stored in the text memory 41 of FIG. 8 are printed on the print tape 5 as shown in FIG. 13. The bar code is flanked on both sides by the left-hand side margin LY and the right-hand side margin RY. The two margins separate the bar code distinctly from the character string on the same line. This allows bar code readers subsequently to read the printed bar code unfailingly. Even if, say, the left-hand side characters are modified to be widened (i.e., in italics), the left-hand side margin LY keeps the bar code from overlapping with the rightmost end of the adjacent character.

According to the present invention, the margins LY and RY on both sides of the bar code may have more than 45 dot columns each. The invention may be applied to any bar code printing apparatuses having a printing mechanism for printing character strings and bar codes using dot patterns. Modifications and changes will be apparent to those skilled in the art without departing from the scope of the invention as defined in the appended claims.

What is claimed is:

1. A bar code printing apparatus for printing characters and a bar code on a printing medium, comprising:

input means for inputting character data, bar code data and commands;

memory means for storing the input data;

print data creating means for creating print data for printing the characters and the bar code based on the stored data, including side margin creating means for creating blank side margins on right and left sides of the printed bar code and means for changing the height of the bar code in accordance with a change of character size;

print means for printing the characters and bar code with the blank side margins; and an alarm for warning an operator when the memory means has a predetermined amount of data comprising the bar code data and input of additional bar code data is attempted, and for warning when the memory means does not contain the predetermined amount of data and printing is attempted, wherein the print data creating means comprises a bar code input mode selection means for establishing a bar code input mode.

2. The bar code printing apparatus of claim 1, wherein in the bar code input mode a bar code starting code, bar code numeric codes and a bar code termination code are stored in the memory means.

3. The bar code printing apparatus of claim 2, wherein the print data creating means further comprises text data determination means for determining whether text data including bar code starting codes and termination codes exist in the memory means.

4. The bar code printing apparatus of claim 3, wherein the side margin creating means creates margin data having a width where the text data determination means determines the existence of bar code starting codes and termination codes.

5. The bar code printing apparatus of claim 1, wherein the side margin creating means creates a left side margin with a width directly adjacent to the left side of the bar code.

6. The bar code printing apparatus of claim 5, wherein the side margin creating means creates a right side margin with a width directly adjacent to the right side of the bar code.

7. The bar code printing apparatus of claim 1, wherein the print data creating means creates dot pattern data from the input character data and bar code data.

8. The bar code printing apparatus of claim 1, wherein the memory means stores bar code starting codes and bar code termination codes.

9. The bar code printing apparatus of claim 1, wherein the memory means stores size data for the characters, and the print data creating means creates the print data for the bar code based on the stored size data of the characters.

10. A bar code printing assembly for printing characters and a bar code on a printing medium, comprising:

a memory for storing character data and bar code data;

a print data creator for creating print data for printing the characters and bar code with blank side margins on right and left sides of the printed bar code and changing the height of the bar code in accordance with a change of character size;

a printer for printing the characters and bar code with the blank side margins; and an alarm for warning an operator when the memory has a predetermined amount of data comprising the bar code data and input of additional bar code data is attempted, and for warning when the memory does not contain the predetermined amount of data and printing is attempted, wherein the print data creator comprises a bar code input mode selector for establishing a bar code input mode.

11. The bar code printing assembly of claim 10, wherein in the bar code input mode a bar code starting code, bar code numeric codes and a bar code termination code are stored in the memory.

12. The bar code printing assembly of claim 11, wherein the print data creator determines whether text data including bar code starting codes and termination codes exists in the memory.

13. The bar code printing assembly of claim 12, wherein the side margin creator creates margin data having a width where the existence of bar code starting codes and termination codes are determined.

14. The bar code printing assembly of claim 10, wherein the print data creator creates a left side margin with a width directly adjacent to the left side of the bar code.

15. The bar code printing assembly of claim 14, wherein the print data creator creates a right side margin with a width directly adjacent to the right side of the bar code.

16. The bar code printing assembly of claim 10, wherein the print data creator creates dot pattern data from the input character data and bar code data.

17. A method of printing characters and a bar code with blank side margins on a printing medium, comprising the steps of:

inputting character data in a character mode;

inputting bar code data in a bar code mode;

storing the character data and the bar code data;

issuing a warning when the bar code data is improper;

creating blank side margins on right and left sides of the printed bar code;

changing the height of the bar code in accordance with a change of character size; and printing the characters and the bar code with the blank side margins and having the same height.

18. The bar code printing apparatus of claim 1, further comprising means for changing a height of the bar code in accordance with a change of character size.

19. The bar code printing assembly of claim 10, further comprising means for changing a height of the bar code in accordance with a change of character size.

20. The method of printing of claim 17, wherein the step of issuing a warning that the bar code data is improper occurs when a data memory contains a predetermined amount of bar code data and entry of additional bar code data is attempted and also issuing a warning when printing is commanded and the data memory does not contain the predetermined amount of bar code data.

* * * * *